(12) United States Patent
Kinme et al.

(10) Patent No.: US 7,461,996 B2
(45) Date of Patent: Dec. 9, 2008

(54) ERRONEOUS ASSEMBLING PREVENTING TOOL FOR UNIVERSAL JOINT AND UNIVERSAL JOINT

(75) Inventors: Shigetaka Kinme, Kashihara (JP); Mitsuharu Ozaki, Kashiba (JP); Katsutoshi Nishizaki, Nabari (JP); Akio Kobayashi, Yao (JP); Takehiko Ozawa, Aichi (JP)

(73) Assignees: Jtekt Corporation, Osaka (JP); Koyo Machine Industries Co., Ltd., Osaka (JP); Togo Seisakusyo Corporation, Aichi (JP)

(*) Notice: Subject to any disclaimer, the term of this patent is extended or adjusted under 35 U.S.C. 154(b) by 300 days.

(21) Appl. No.: 11/356,326

(22) Filed: Feb. 17, 2006

(65) Prior Publication Data

US 2006/0204326 A1 Sep. 14, 2006

(30) Foreign Application Priority Data

Feb. 17, 2005 (JP) ................................ 2005-41233

(51) Int. Cl.
*F16D 1/12* (2006.01)
(52) U.S. Cl. .................... 403/319; 403/232.1; 403/234; 403/236; 403/237; 403/316; 464/134
(58) Field of Classification Search ............. 403/232.1, 403/233, 234, 235, 236, 237, 302, 309, 313, 403/316, 319, 324, 355; 464/134, 182
See application file for complete search history.

(56) References Cited

U.S. PATENT DOCUMENTS

| 4,504,164 | A | * | 3/1985 | Bien | ........................ 403/109.3 |
|---|---|---|---|---|---|
| 4,537,523 | A | | 8/1985 | Haldric | |
| 4,900,178 | A | | 2/1990 | Haldric et al. | |
| 5,090,833 | A | * | 2/1992 | Oertle et al. | ................... 403/12 |
| 5,647,686 | A | | 7/1997 | Hancock et al. | |
| 6,575,658 | B2 | * | 6/2003 | Daniel et al. | ................ 403/316 |
| 6,739,790 | B1 | * | 5/2004 | Crudele | ..................... 403/316 |

FOREIGN PATENT DOCUMENTS

| DE | 19847526 A1 | 4/2000 |
|---|---|---|
| DE | 10232771 | 1/2004 |
| FR | 2608232 | 6/1988 |
| JP | 2001-280361 | 10/2001 |
| WO | WO2004063587 | 7/2004 |

* cited by examiner

*Primary Examiner*—Michael P Ferguson
(74) *Attorney, Agent, or Firm*—Rabin & Berdo, PC

(57) ABSTRACT

An erroneous assembling preventing tool for a universal joint prevents a shaft from being fixed to a cylindrical section of a yoke main body of the universal joint by fastening a bolt in a state where the shaft is not inserted into a normal position of an axial direction of the cylindrical section. The erroneous assembling preventing tool comprises a fixing section fixed to the yoke main body, a prevention section arranged between first and second tabs of the yoke main body, and a driving section for driving a prevention section. The prevention section is displaceable to a prevention position at which an end of the bolt can be prevented from being inserted through a screw hole of the second tab of the yoke and a prevention release position. The driving section displaces the prevention section to the prevention release position when it is pressed by an end of the shaft inserted into the normal position of the axial direction of the cylindrical section.

8 Claims, 6 Drawing Sheets

ERRONEOUS ASSEMBLING PREVENTING TOOL FOR UNIVERSAL JOINT AND UNIVERSAL JOINT

BACKGROUND OF THE INVENTION

1. Field of the Invention

The present invention relates to an erroneous assembling preventing tool for a universal joint and a universal joint comprising the same.

2. Description of Related Arts

This type of universal joint comprises a yoke for connecting a shaft, and the yoke comprises a yoke main body. The yoke main body comprises a cylindrical section forming a slit axially extending, and first and second tabs that are opposed to each other with the slit sandwiched therebetween. A bolt inserted through a bolt insertion hole of the first tab is screwed into a screw hole of the second tab so that the shaft is fastened by the cylindrical section. As a result, the shaft is fixed to the yoke main body.

The shaft usually has a relief portion, which is in a circular arc shape in cross section, provided at a predetermined position in an axial direction of its outer periphery. The bolt is inserted through the relief portion. This causes the shaft to be regulated at a normal position of the axial direction by the bolt.

On the other hand, there is a case where the amount of insertion of the shaft into the cylindrical section is insufficient so that the shaft does not reach the normal position (in a so-called incompletely fitted state). In this case, a front end of the bolt interferes with the shaft, so that the bolt cannot be inserted into the screw hole of the second tab. This prevents such erroneous assembling that the shaft, which is not at the normal position, is assembled in the yoke main body (see Japanese Unexamined Patent Publication No. 2001-280361, for example).

In such an incompletely fitted state that a front end of the shaft does not reach the position of the bolt, however, the shaft may, in some cases, allow the insertion of the bolt. In this case, the erroneous assembling may occur.

An object of the present invention is to provide an erroneous assembling preventing tool for a universal joint, which can reliably prevent erroneous assembling of a shaft, and a universal joint comprising the same.

SUMMARY OF THE INVENTION

In order to attain the above-mentioned object, a preferred mode of the present invention provides an erroneous assembling preventing tool used for a universal joint. The universal joint has a yoke main body comprising a cylindrical section forming a slit axially extending, and first and second tabs that are opposed to each other with the slit sandwiched therebetween, and a fixing member for fixing to the cylindrical section a shaft inserted into the cylindrical section in an axial direction of the cylindrical section by bringing the first and second tabs near to each other, the fixing member comprising a bolt screwed into a screw hole of the second tab through a bolt insertion hole of the first tab. The erroneous assembling preventing tool prevents the shaft from being fixed to the cylindrical section by fastening the bolt in a state where the shaft is not inserted into a normal position of the axial direction of the cylindrical section.

The erroneous assembling preventing tool comprises a fixing section fixed to the yoke main body, a prevention section arranged between the first and second tabs, and a driving section for driving the prevention section. The prevention section is displaceable to a prevention position at which the bolt is prevented from being inserted through the screw hole by being abutted against an end of the bolt and a prevention release position at which the prevention is released. The driving section displaces the prevention section to the prevention release position when the driving section is pressed by an end of the shaft inserted into the normal position of the axial direction of the cylindrical section.

In this mode, when the bolt is inserted through the bolt insertion hole of the first tab in a state where the shaft is not inserted into the normal position of the cylindrical section (a so-called incompletely fitted state), the end of the bolt is abutted on the erroneous assembling preventing tool at the prevention position. This prevents the bolt from being screwed into the screw hole of the second tab, so that the shaft cannot be fixed by the bolt. As a result, it is possible to prevent such erroneous assembling that the shaft is fixed to the yoke main body with the shaft remaining incompletely fitted.

On the other hand, when the shaft is inserted into the normal position of the cylindrical section, the driving section of the erroneous assembling preventing tool is pressed by the end of the shaft as the shaft is inserted. Consequently, the prevention section of the erroneous assembling preventing tool is displaced to the prevention release position. This allows the bolt inserted through the bolt insertion hole of the first tab to be screwed into the screw hole of the second tab. As a result, the shaft at the normal position can be fixed to the yoke main body by the bolt.

DETAILED DESCRIPTION OF THE PREFERRED EMBODIMENT

A preferred embodiment of the present invention will be described while referring to the accompanying drawings.

Figure 1:
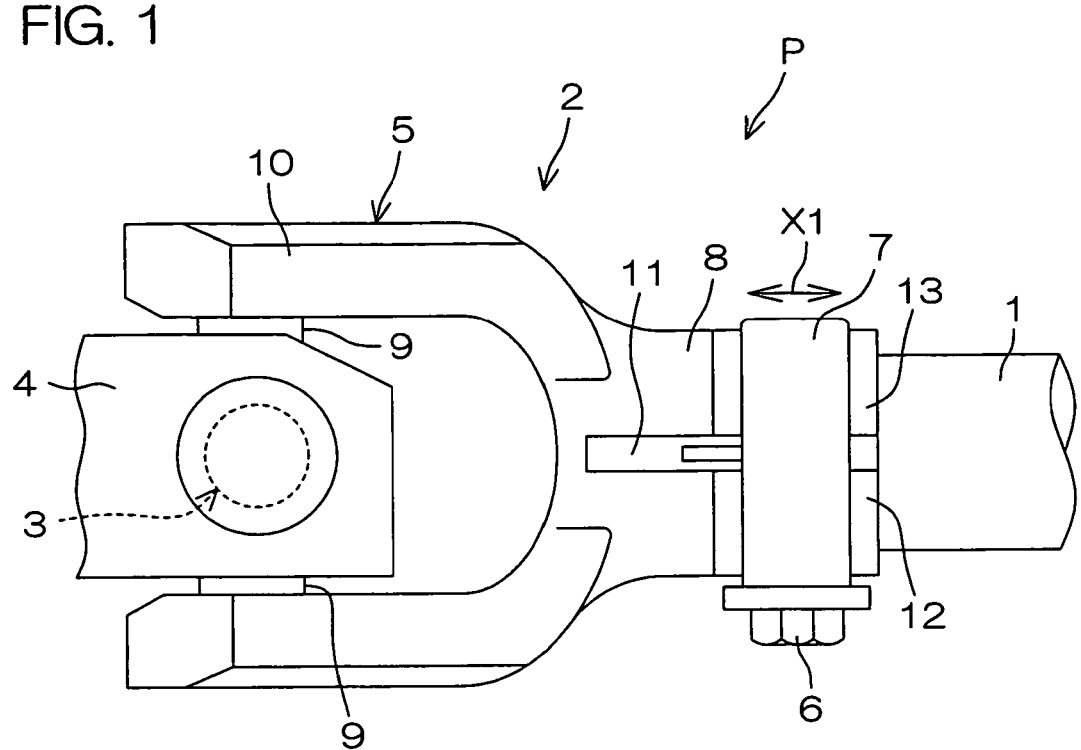
FIG. 1 is a front view of a coupling structure of a universal joint comprising an erroneous assembling preventing tool according to an embodiment of the present invention and a shaft.

FIG. 1 is a front view of a coupling structure of a universal joint P to which an erroneous assembling preventing tool according to an embodiment of the present invention is applied and a shaft. Referring to FIG. 1, a shaft 1 composed of an intermediate shaft, for example, of a steering apparatus of an automobile is fitted in a universal joint yoke 2. The universal joint yoke 2 is connected to another universal joint yoke 4 through a cross shaft 3. The other universal joint yoke 4 is connected to a pinion shaft (not shown) of a steering mechanism composed of a rack-and-pinion mechanism, for example.

The universal joint yoke 2 comprises a yoke main body 5, a bolt 6 serving as a fixing member for fixing the shaft 1 to the yoke main body 5, and an erroneous assembling preventing tool 7. The erroneous assembling preventing tool 7 prevents the shaft 1 from being fixed to a cylindrical section 8, described later, in the yoke main body 5 by fastening the bolt 6 in a state where the shaft 1 is not inserted into a normal position of an axial direction X1 of the cylindrical section 8 of the yoke main body 5.

The yoke main body 5 comprises the cylindrical section 8 for inserting the shaft 1 in the axial direction X1 and holding the inserted shaft 1, and a fork 10 extending so as to diverge in two directions at one end of the cylindrical section 8 for supporting a pair of trunnions 9 of the cross shaft 3 through a bearing (not shown).

The cylindrical section 8 forms a slit 11 extending in the axial direction X1. The yoke main body 5 comprises a first tab 12 and a second tab 13 that are opposed to each other with the slit 11 sandwiched therebetween.

Figure 2:
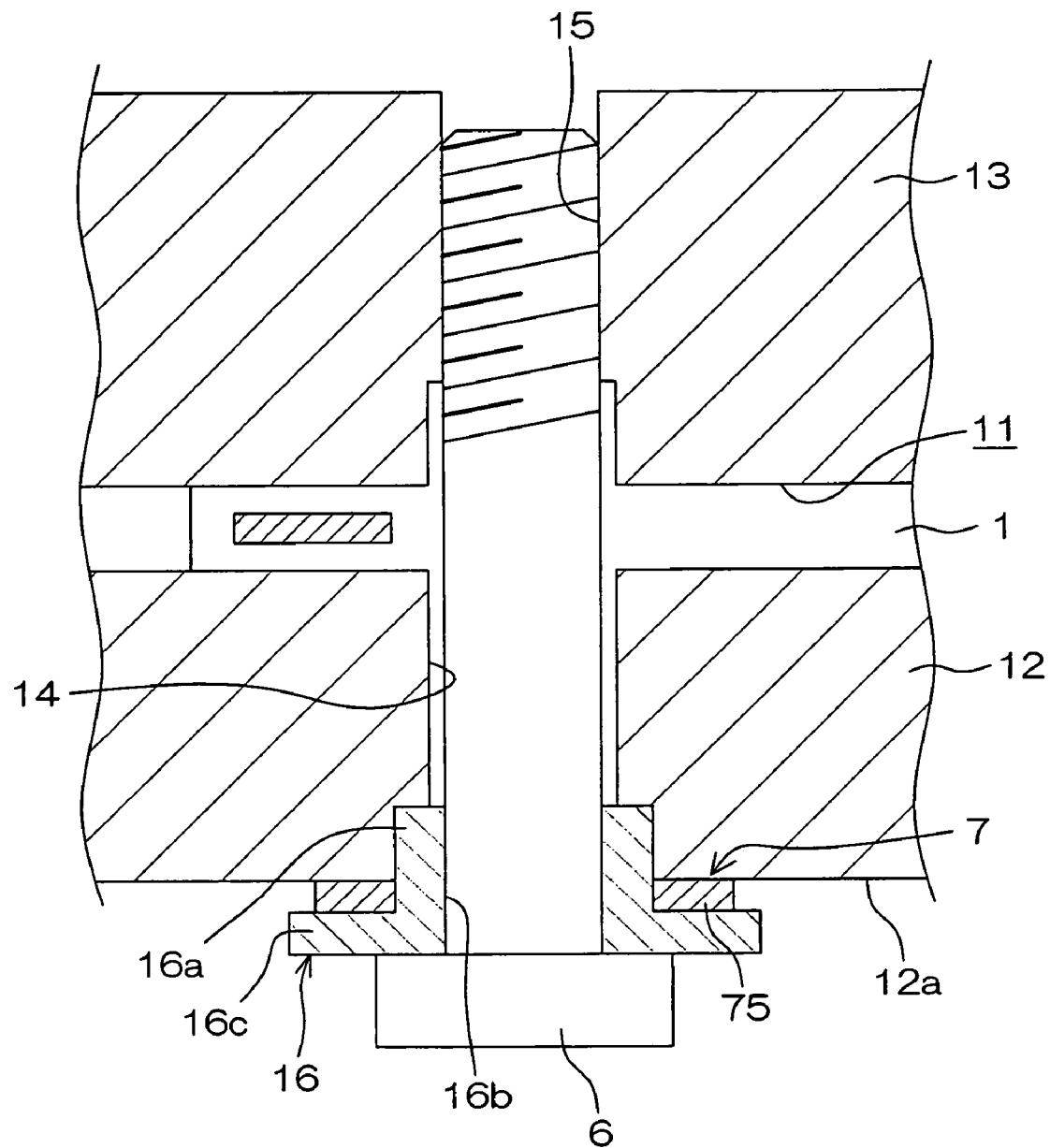
FIG. 2 is a cross-sectional view of a principal part of the coupling structure.

Referring to FIG. 2 that is a cross-sectional view including an axis of the bolt 6, the bolt 6 is screwed into a screw hole 15 formed on the second tab 13 through a bolt insertion hole 14 formed on the first tab 12. As the bolt 6 is screwed, the first and second tabs 12 and 13 are brought closer to each other, so that the diameter of the cylindrical section 8 is reduced. As a result, the shaft 1 is fastened by the cylindrical section 8, so that the shaft 1 is fixed to the cylindrical section 8.

A sleeve 16a of a fixing tool 16 is pressed into an inlet of the bolt insertion hole 14 of the first tab 12. The fixing tool 16 serves to fix an annular fixing section, described later, of the erroneous assembling preventing tool 7 along an outer side surface 12a of the first tab 12. The sleeve 16a has a bolt insertion hole 16b into which the bolt 6 is inserted. The fixing tool 16 has an annular flange 16c at one end of the sleeve 16a. The fixing section fitted in the outer periphery of the sleeve 16a is fixed by being held between the annular flange 16c and the outer side surface 12a of the first tab 12.

Figure 3:
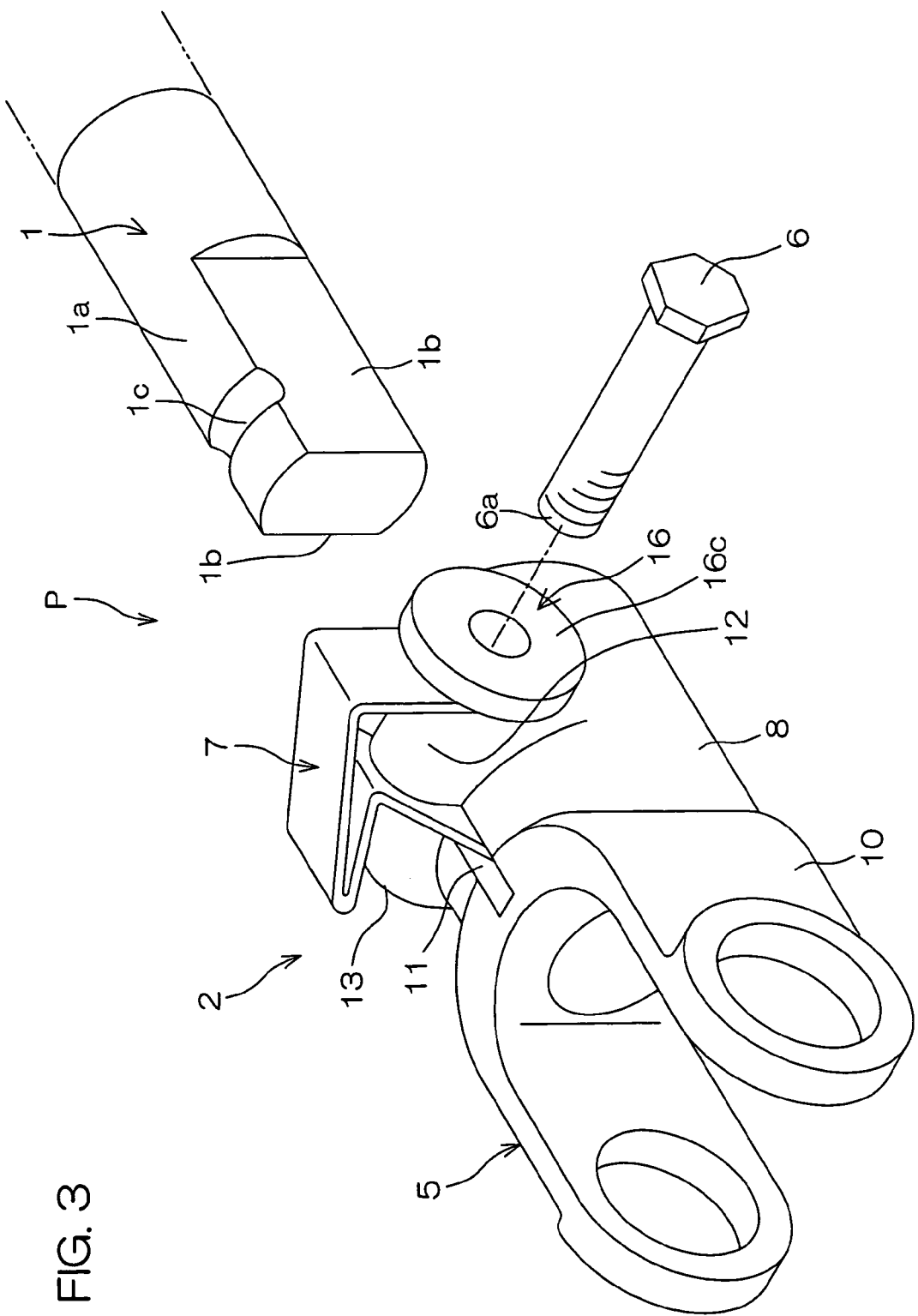
FIG. 3 is an exploded perspective view of the coupling structure.

Referring to FIG. 3 that is an exploded perspective view of the coupling structure, a pair of flat portions 1b, which are opposed to each other and form width across flats inbetween are formed on an outer peripheral surface at an end 1a of the shaft 1. A relief groove 1c for the bolt 6 is formed on the outer peripheral surface at the end 1a of the shaft 1 in such a manner that it is perpendicular to the pair of flat portions 1b. An inner peripheral surface of the cylindrical section 8 is formed in such a shape that it coincides with an end shape of the shaft 1 forming the width across flats. As a result, when the shaft 1 is assembled in the cylindrical section 8, relative rotation between the shaft 1 and the cylindrical section 8 is regulated.

Figure 4:
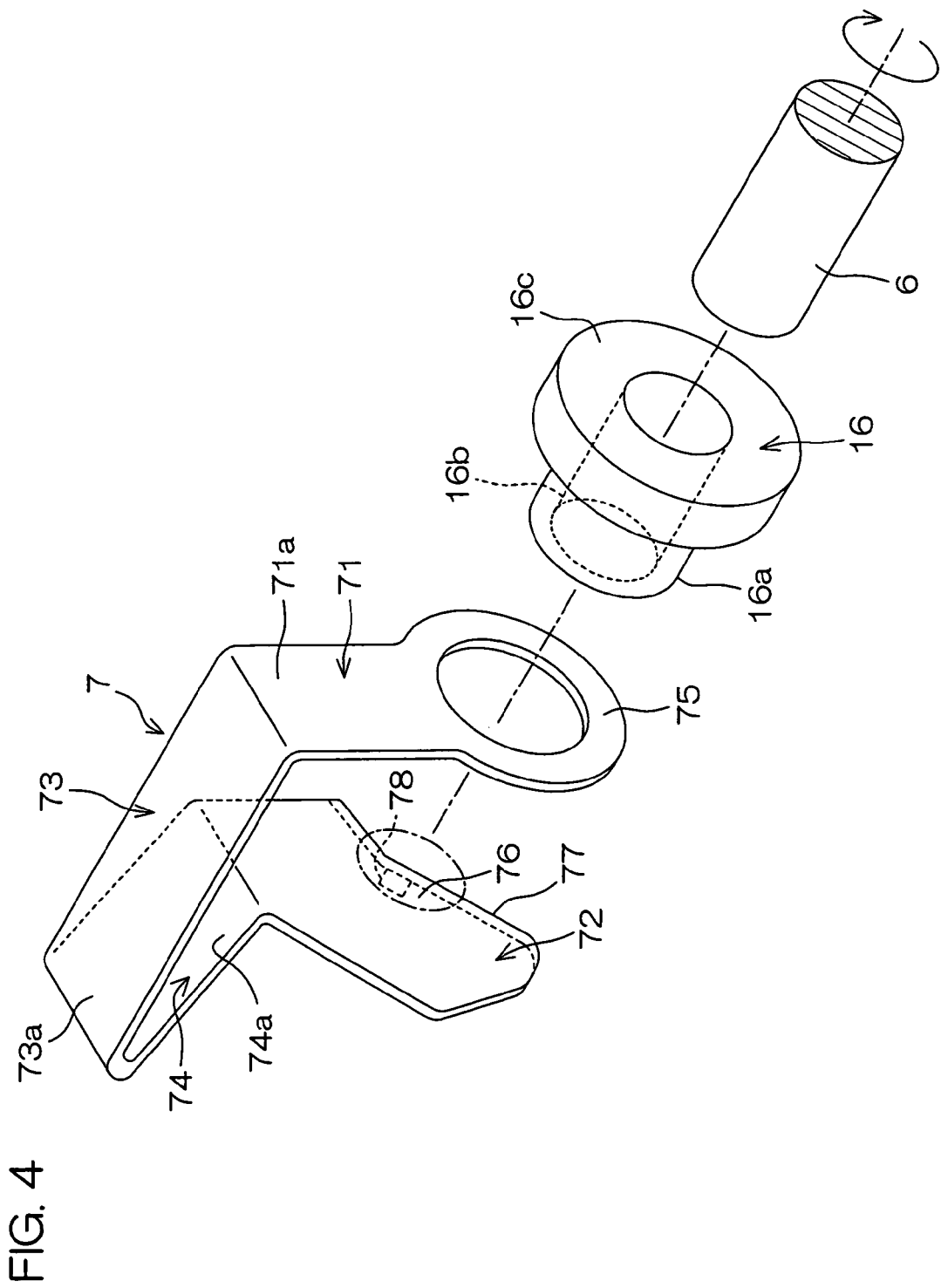
FIG. 4 is an exploded perspective view of the principal part of the coupling structure.

Referring to FIG. 4, the erroneous assembling preventing tool 7 is integrally formed of a single member (a steel plate) and has predetermined elasticity.

The erroneous assembling preventing tool 7 comprises a first plate 71 at least a part of which is fixed along the outer side surface 12a of the first tab 12, a second plate 72 at least a part of which is arranged within the slit 11, and a connection section for connecting the first plate 71 and the second plate 72. The connection section comprises a third plate 73 and a fourth plate 74.

The third plate 73 extends from an end 71a of the first plate 71 toward the second tab 13 (e.g., parallel to a fastening axis of the bolt). The fourth plate 74 is folded from an end 73a of the third plate 73. The third plate 73 and the fourth plate 74 cross each other at an acute angle. The second plate 72 is folded in a generally orthogonal shape from an end 74a of the fourth plate 74, and is inserted into the slit 11.

The first plate 71 is provided with an annular fixing section 75. The fixing section 75 is pressed by the annular flange 16c of the fixing tool 16 and is fixed to the outer side surface 12a of the first tab 12.

The second plate 72 is provided with a prevention section 76. The prevention section 76 is displaceable to a prevention position for preventing the bolt 6 from being inserted under predetermined conditions (see FIG. 5A) and a prevention release position for releasing the prevention (see FIG. 5C). As shown in FIGS. 4 and 5B, the second plate 72 is provided with a driving section 77. The driving section 77 is pressed by the end of the shaft 1 inserted into the cylindrical section 8 to displace the prevention section 76 to the prevention release position. The driving section 77 is composed of at least a part of an inclined edge of the second plate 72.

Figure 6A:
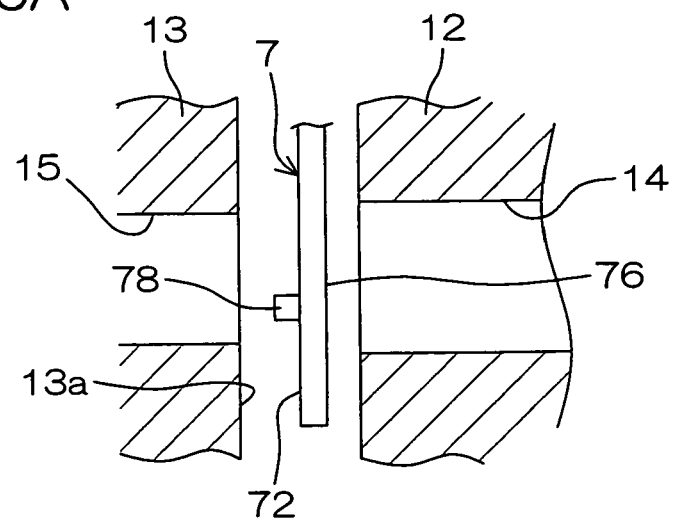
FIGS. 6A, 6B, and 6C are cross-sectional views of the coupling structure for explaining the action of a projection for reliably preventing erroneous assembling.

Referring to FIGS. 4 and 6A, a projection 78 composed of a folded member folded so as to come closer to the screw hole 15 of the second tab 13 from the edge of the second plate 72.

Figure 5A:
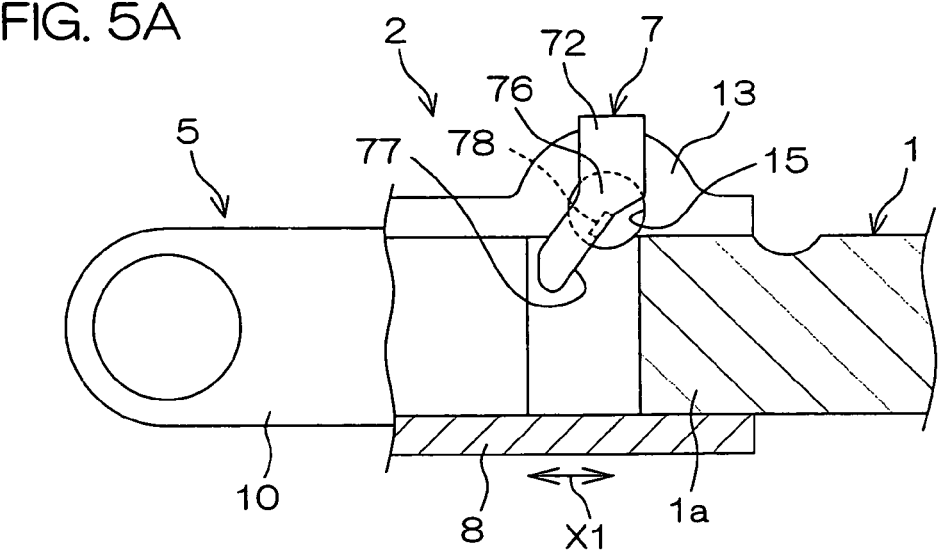
FIG. 5A is a cross-sectional view of the coupling structure in a state where the shaft is in an incompletely fitted state.
Figure 5B:
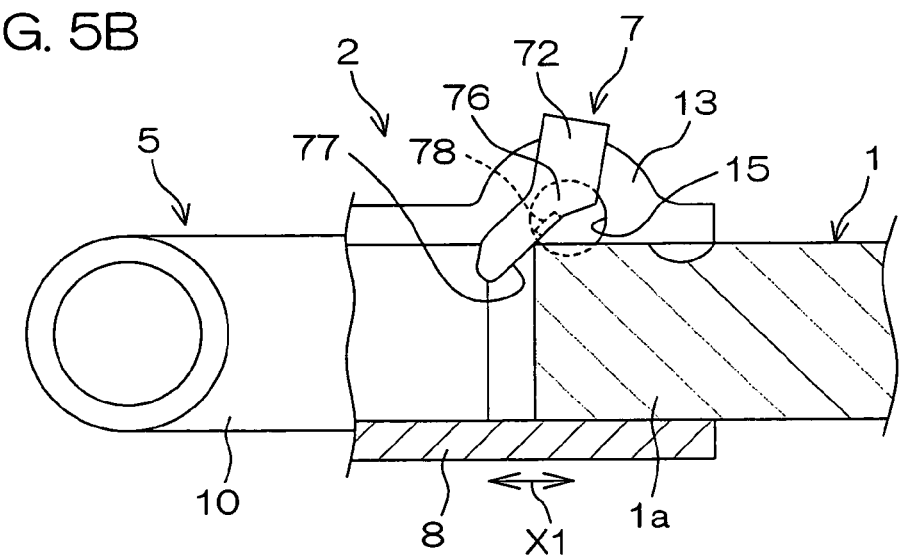
FIG. 5B is a cross-sectional view of the coupling structure representing the process of inserting the shaft into a normal position.
Figure 5C:
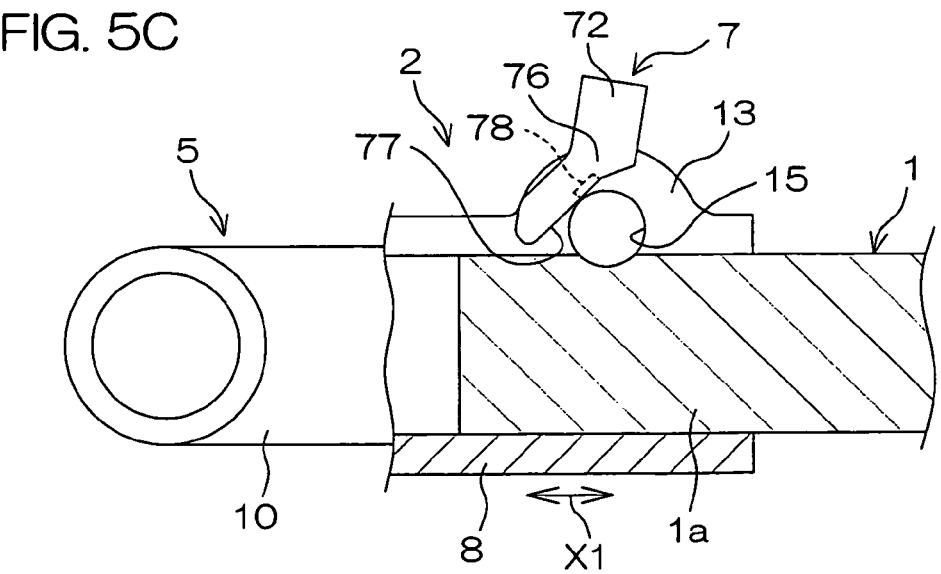
FIG. 5C is a cross-sectional view of the coupling structure in case the shaft is at the normal position.

According to the present embodiment, when the shaft 1 is in a state where it is not inserted into the normal position of the axial direction X1 of the cylindrical section 8, as shown in FIG. 5C, that is, in a so-called incompletely fitted state, as shown in FIG. 5A, the prevention section 76 at the prevention position of the erroneous assembling preventing tool 7 is overlapped with a part of the screw hole 15 of the second tab 13, as viewed from the direction of insertion of the bolt 6. When the bolt 6 is inserted through the bolt insertion hole 14 of the first tab 12, therefore, the front end of the bolt 6 is abutted on the prevention section 76 at the prevention position. This prevents the bolt 6 from being screwed into the screw hole 15 of the second tab 13, so that the shaft 1 cannot be fixed by the bolt 6. As a result, it is possible to reliably prevent such erroneous assembling that the shaft 1 is fixed to the yoke main body 5 with the shaft 1 remaining incompletely fitted.

On the other hand, when the shaft 1 is inserted into the normal position of the axial direction X1 of the cylindrical section 8, as shown in FIG. 5C, the driving section 77 of the erroneous assembling preventing tool 7 is pressed by the end 1a of the shaft 1, as shown in FIG. 5B, as the shaft 1 is inserted in the case of the insertion. As a result, the prevention section 76 of the erroneous assembling preventing tool 7 is displaced to the prevention release position, shown in FIG. 5C. This allows the bolt 6 inserted through the bolt insertion hole 14 of the first tab 12 to be screwed into the screw hole 15 of the second tab 13. As a result, the shaft 1 at the normal position can be fixed to the yoke main body 5 by the bolt 6.

When the prevention section 76 of the erroneous assembling preventing tool 7 is displaced, the prevention section 76 is deformed in a sufficient amount by the third plate 73 and the fourth plate 74. Therefore, the amount of displacement of the second plate 72 including the prevention section 76 can be sufficiently ensured.

Since the whole of the erroneous assembling preventing tool 7 is integrally formed of a single steel metal, the manufacturing cost can be made lower. Moreover, the erroneous assembling preventing tool 7 formed of a steel metal has the following advantages because it has elasticity for elastically urging the prevention section 76 to the prevention position. That is, when the shaft 1 is removed from the universal joint yoke 2 for the purpose of maintenance, for example, the prevention section 76 of the erroneous assembling preventing tool 7 elastically returns to the prevention position, so that the erroneous assembling can be prevented even at the time of reassembling.

Figure 6B:
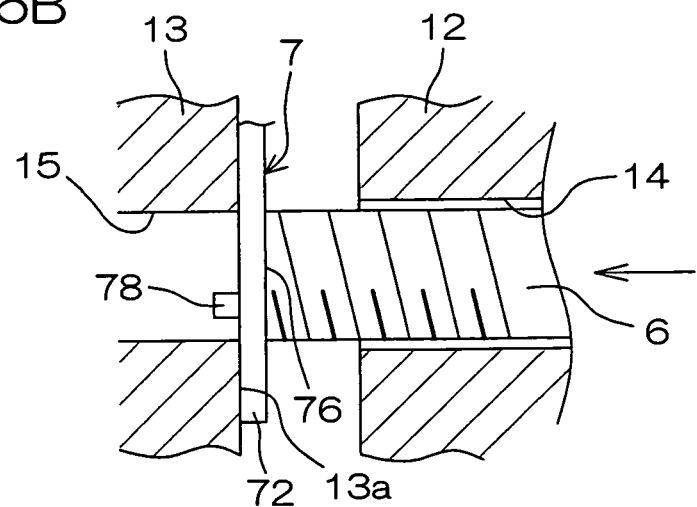
Figure 6C:
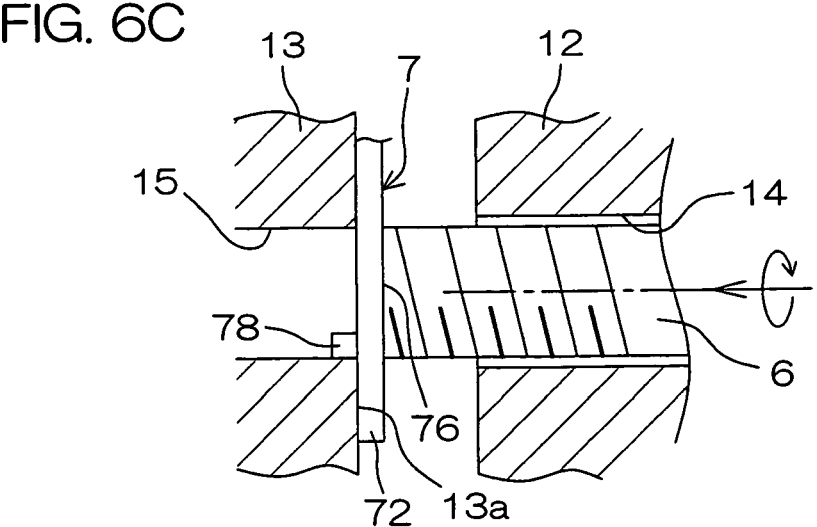

Furthermore, the projection 78 can more reliably prevent the shaft 1 from being erroneously assembled. That is, when the prevention section 76 at the prevention position, as shown in FIGS. 5A and 6A, is pressed on an inner side surface 13a of the second tab 13 by the front end of the bolt 6, as shown in FIG. 6B, the projection 78 enters the screw hole 15 of the second tab 13. Even if the prevention section 76 receives a frictional torque by the front end of the bolt 6 when the bolt 6 is operated to rotate in this state, the projection 78 is engaged with an edge of the screw hole 15 of the second tab 13, as shown in FIG. 6C, so that the displacement of the prevention section 76 toward the prevention release position. As a result, the erroneous assembling can be reliably prevented.

The present invention is not limited to the above-mentioned embodiment. For example, the projection 78 may be removed. The shaft 1 and the cylindrical section 8 may be spline-fitted to regulate relative rotation therebetween. In the erroneous assembling preventing tool 7, the fourth plate 74 may be removed so that the second plate 72 is directly coupled from the third plate 73. Further, the erroneous assembling preventing tool 7 may be fastened to the yoke main body 5 with a screw.

The universal joint according to the present invention may be applied to coupling between an intermediate shaft and an end of a spline shaft.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

The present application corresponds to a Japanese Patent Application No. 2005-41233 filed to the Japanese Patent Office on Feb. 17, 2005, the disclosure of which is hereinto incorporated by reference.

The invention claimed is:

1. An erroneous assembling preventing tool for use with a universal joint having a yoke main body comprising a cylindrical section forming a slit axially extending and first and second tabs that are opposed to each other with the slit sandwiched therebetween, and a fixing member for fixing to the cylindrical section a shaft inserted into the cylindrical section in an axial direction of the cylindrical section by bringing the first and second tabs near to each other, the fixing member comprising a bolt screwed into a screw hole of the second tab through a bolt insertion hole of the first tab, for preventing the shaft from being fixed to the cylindrical section by fastening the bolt in a state where the shaft is not inserted into a normal position of the axial direction of the cylindrical section, the erroneous assembling preventing tool comprising:

a fixing section fixed to the yoke main body;

a prevention section arranged between the first and second tabs; and a driving section for driving the prevention section, wherein the prevention section is displaceable to a prevention position at which the bolt is prevented from being inserted through the screw hole by being abutted on an end of the bolt and a prevention release position at which the prevention position is released, and wherein the driving section displaces the prevention section to the prevention release position when the driving section is pressed by an end of the shaft inserted into the normal position of the axial direction of the cylindrical section, and wherein the fixing section, the prevention section, and the driving section are integrally formed of a single steel plate having elasticity for elastically urging the prevention section to the prevention position, and the erroneous assembling preventing tool further comprising:

a first plate at least a part of which is along an outer side surface of the first tab;

a second plate at least a part of which is arranged in the slit; and a connection section for connecting the first plate and the second plate, wherein the second plate is provided with the prevention section and the driving section, and wherein the second plate comprises an edge inclined in the axial direction of the cylindrical section, and the driving section is provided at the edge of the second plate, and the erroneous assembling preventing tool further comprising:

a projection folded from the edge of the second plate, wherein the projection is inserted into the screw hole of the second tab when the prevention section at the prevention position is pressed on an inner side surface of the second tab by the edge of the bolt.

2. The erroneous assembling preventing tool according to claim 1, wherein:

the connection section comprises a third plate and a fourth plate, the third plate extends from an end of the first plate toward the second tab, the fourth plate is folded from an end of the third plate, and the second plate is folded from an end of the fourth plate.

3. The erroneous assembling preventing tool according to claim 1, wherein the projection inserted into the screw hole of the second tab is engaged with the edge of the screw hole of the second tab as the bolt is rotated, so that the displacement of the prevention section to the prevention release position is regulated by the projection.

4. The erroneous assembling preventing tool according to claim 1, further comprising:

a regulation section that proceeds into the screw hole of the second tab when the prevention section at the prevention position is pressed on the inner side surface of the second tab by the end of the bolt, wherein the regulation section that has proceeded into the screw hole of the second tab is engaged with the edge of the screw hole of the second tab as the bolt is rotated, so that the displacement of the prevention section to the prevention release position is regulated by the regulation section.

5. A universal joint comprising:

a yoke main body comprising a cylindrical section forming a slit axially extending and first and second tabs that are opposed to each other with the slit sandwiched therebetween;

a fixing member for fixing to the cylindrical section a shaft inserted into the cylindrical section in an axial direction of the cylindrical section by bringing the first and second tabs near to each other, the fixing member comprising a bolt screwed into a screw hole of the second tab through a bolt insertion hole of the first tab; and an erroneous preventing tool for preventing the shaft from being fixed to the cylindrical section by fastening the bolt in a state where the shaft is not inserted into a normal position of the axial direction of the cylindrical section, the erroneous assembling preventing tool comprising:

a fixing section fixed to the yoke main body;

a prevention section arranged between the first and second tabs; and a driving section for driving the prevention section, wherein the prevention section is displaceable to a prevention position at which the bolt is prevented from being inserted through the screw hole by being abutted on an end of the bolt and a prevention release position at which the prevention position is released, and wherein the driving section displaces the prevention section to the prevention release position when the driving section is pressed by an end of the shaft inserted into the normal position of the axial direction of the cylindrical section, and wherein the fixing section, the prevention section, and the driving section are integrally formed of a single steel plate having elasticity for elastically urging the prevention section to the prevention position, and the erroneous assembling preventing tool further comprising:

a first plate at least a part of which is along an outer side surface of the first tab, a second plate at least a part of which is arranged in the slit, and a connection section for connecting the first plate and the second plate, wherein the second plate is provided with the prevention section and the driving section, and wherein the second plate comprises an edge inclined in the axial direction of the cylindrical section, and the driving section is provided at the edge of the second plate, the erroneous assembling preventing tool further comprising a projection folded from the edge of the second plate, wherein the projection is inserted into the screw hole of the second tab when the prevention section at the prevention position is pressed on an inner side surface of the second tab by the end of the bolt.

6. The universal joint according to claim 5, wherein:

the connection section comprises a third plate and a fourth plate, the third plate extends from an end of the first plate toward the second tab, the fourth plate is folded from an end of the third plate, and the second plate is folded from an end of the fourth plate.

7. The universal joint according to claim 5, wherein the projection inserted into the screw hole of the second tab is engaged with the edge of the screw hole of the second tab as the bolt is rotated, so that the displacement of the prevention section to the prevention release position is regulated by the projection.

8. The universal joint according to claim 5, wherein the erroneous assembling preventing tool further comprises a regulation section that proceeds into the screw hole of the second tab when the prevention sectiom at the prevention position is pressed on the inner side of the second tab by the end of the bolt, and wherein the regulation section that has proceeded into the screw hole of the second tab is engaged with the edge of the screw hole of the second tab as the bolt is rotated, so that the displacement of the prevention section to the prevention release position is regulated by the regulation section.

* * * * *

UNITED STATES PATENT AND TRADEMARK OFFICE
CERTIFICATE OF CORRECTION

| | |
|---|---|
| PATENT NO. | : 7,461,996 B2 |
| APPLICATION NO. | : 11/356326 |
| DATED | : December 9, 2008 |
| INVENTOR(S) | : Shigetaka Kinme et al. |

It is certified that error appears in the above-identified patent and that said Letters Patent is hereby corrected as shown below:

Column 8, line 22, after "side", insert --surface--.

Signed and Sealed this

Tenth Day of February, 2009

JOHN DOLL
*Acting Director of the United States Patent and Trademark Office*

UNITED STATES PATENT AND TRADEMARK OFFICE
Certificate

Patent No. 7,461,996 B2　　　　　　　　　　　　　　　　　　　　　　　Patented: December 9, 2008

On petition requesting issuance of a certificate for correction of inventorship pursuant to 35 U.S.C. 256, it has been found that the above identified patent, through error and without any deceptive intent, improperly sets forth the inventorship.
　　Accordingly, it is hereby certified that the correct inventorship of this patent is: Shigetaka Kinme, Kashihara (JP); Mitsuharu Ozaki, Kashiba (JP); Katsutoshi Nishizaki, Nabari (JP); Akio Kobayashi, Yao (JP); Takehiko Ozawa, Aichi (JP); and Tadakatsu Take, Kanagawa (JP).

Signed and Sealed this Seventh Day of May 2013.

*DANIEL P. STODOLA*
*Supervisory Patent Examiner*
Art Unit 3679
Technology Center 3600